United States Patent [19]
Gyugyi et al.

[11] Patent Number: 5,642,007
[45] Date of Patent: Jun. 24, 1997

[54] SERIES COMPENSATOR INSERTING REAL AND REACTIVE IMPEDANCE INTO ELECTRIC POWER SYSTEM FOR DAMPING POWER OSCILLATIONS

[75] Inventors: Laszlo Gyugyi, Penn Hills; Colin D. Schauder, Murrysville, both of Pa.

[73] Assignee: Westinghouse Electric Corporation, Pittsburgh, Pa.

[21] Appl. No.: 366,646

[22] Filed: Dec. 30, 1994

[51] Int. Cl.⁶ .................... H02J 3/24; G05F 1/70
[52] U.S. Cl. ............................ 307/102; 323/207
[58] Field of Search ..................... 307/102, 103, 307/45, 46, 69; 323/207–209; 327/186, 362, 527

[56] References Cited

U.S. PATENT DOCUMENTS

| | | | |
|---|---|---|---|
| 5,166,597 | 11/1992 | Larsen et al. | 323/215 |
| 5,198,746 | 3/1993 | Gyugyi et al. | 323/207 |
| 5,227,713 | 7/1993 | Bowler et al. | 307/102 |
| 5,329,222 | 7/1994 | Gyugyi et al. | 323/207 |
| 5,343,139 | 8/1994 | Gyugyi et al. | 323/207 |
| 5,369,353 | 11/1994 | Erdman | 323/207 |

FOREIGN PATENT DOCUMENTS 9303531  2/1993  WIPO .

OTHER PUBLICATIONS

Lopes, L. A., et al., "A PWM Quadrature Booster Phase Shifter For AC Power Transmission," Proceedings of the Annual Power Electronics Specialists Conference, Taiwan, vol. 1, pp. 211–216, Jun. 1994.

Anguist, L. et al., "Power Oscillation Damping Using Controlled Reactive Power Compensation –A Comparison Between Series And Shunt Approaches", IEEE Transactions on Power Systems, vol. 8, No. 2, pp. 687–700, 1 May 1993.

Lee, Y.S. et al., "Application on Superconducting Magnetic Energy Storage Unit on Damping Of Turbogenerator Subsynchronous Oscillation", IEE Proceedings–C. Generation, Transmission, Distribution, vol. 138, No. 5, Part C, pp. 419–426, 1 Sep. 1991.

Dusan, Pouh et al., "Suitable HVDC Control Strategies For Stabilizing AC Networks", Proceedings of the European Conference on Power Electronics an Applications (EPE), vol. 1, pp. 473–478, 9 Oct. 1989.

*Primary Examiner*—Richard T. Elms
*Attorney, Agent, or Firm*—R. P. Lenart

[57] ABSTRACT

A series compensator for damping power oscillations in an electric power transmission system includes a switching power converter which injects a voltage into the transmission line having a phase angle relative to transmission line current which is controlled to provide reactive compensation and to inject virtual real impedance into the line. The switching power converter is a dc to ac converter which is capable of injecting virtual real impedance into the transmission line by virtue of the fact that it has a power exchange device connected to its dc terminals. Where the power exchange device is a resistor, the switching power converter is capable of absorbing real power during surges in power on the line. Alternatively, the power exchange device is a storage device such as a battery bank or a super conducting magnet, in which case the switching power converter can provide both virtual positive and negative real impedance.

28 Claims, 9 Drawing Sheets

SERIES COMPENSATOR INSERTING REAL AND REACTIVE IMPEDANCE INTO ELECTRIC POWER SYSTEM FOR DAMPING POWER OSCILLATIONS

BACKGROUND OF THE INVENTION

1. Field of the Invention

This invention relates to apparatus for damping power oscillations in electric power systems. More particularly it relates to a series compensator which can insert both real and reactive impedance into a transmission line to dampen the power oscillations.

2. Background Information

Power oscillation frequently occurs in electric power systems due to disturbances, such as transmission line faults, line and load switchings, equipment failures and other events causing rapid system changes. Such power oscillation has the undesirable effect of limiting the maximum transmittible power in the system. U.S. Pat. No. 5,198,746 discloses a solid-state series compensator that injects a controllable, 60 Hz voltage in quadrature with the transmission line current. This injected voltage has the same compensating effect as that obtained with a variable capacitor, or inductor, connected in series with the line. The damping of the power oscillation is achieved by appropriate modulation of the effective 60 Hz reactive impedance that the compensator injects in series with the line. That is, when the power in the line is increasing, as a result of acceleration of the power generator at the "sending-end" of the line and the consequent increase of the transmission angle, the capacitive impedance of the compensator is increased by increasing the magnitude of the inserted 60 Hz voltage that lags the line current by 90 electrical degrees, in order to increase the degree of series compensation and thereby the transmittable power. Conversely, when the power in the line is decreasing, as a result of the deceleration of the "sending-end" generator and the consequent decrease in the transmission angle, the inserted voltage is made to lead the line current in order to create, in effect, an inductive output impedance and thereby to increase the overall inductive impedance of the transmission line.

The series compensator of U.S. Pat. No. 5,198,746 utilizes a dc to ac converter to generate the quadrature voltage. The ac terminals of the inverter are connected in series with the transmission line through a coupling transformer. A capacitor connected across the dc terminals provides the dc input voltage for the converter. As the converter is theoretically only exchanging reactive power with the transmission line, there is no power drain on the capacitor. However, there are in reality losses in the switching circuits of the inverter. The real power needed to make up for these losses is provided by generating the compensating voltage at a phase angle slightly less than 90°.

U.S. Pat. No. 5,343,139 discloses a generalized power flow controller for controlling the flow of power through the transmission line on a sustained basis. This power flow controller also utilizes a de to ac inverter which injects a voltage in series with the transmission line voltage. However, the phase angle of the injected voltage relative to line current is not limited to substantially 90° as in the case of the compensator of U.S. Pat. No. 5,198,746, but is controllable to any phase angle between 0 and 360°. The particular phase angle and the magnitude of the injected voltage may be selected to adjust any or all of the transmission line effective impedance, the effective phase angle between voltages at the two ends of the transmission line, and transmission line voltage magnitude. This results in the adjustment of both real and reactive line impedance. Real power needed to adjust the real component of impedance is provided to the dc to ac converter by an ac to dc converter having its ac terminals connected in shunt to the transmission line and its dc terminals connected to the dc terminals of the compensator converter through a de link which includes a capacitor. The response of this flow controller is rapid enough that it can provide dynamic control of power flow, and it is also suitable for damping oscillation which may develop in the power system. However, this equipment designed primarily for power flow control, is more complex and expensive than the series compensator described in U.S. Pat. No. 5,198,746.

There is a need for improved compensator for damping oscillations in electrical power systems.

More particularly, there is a need for such an improved compensator which can provide real power modulation as well as reactive power modulation to damp out power system oscillations.

SUMMARY OF THE INVENTION

These needs and others are satisfied by the invention which is directed to enhanced apparatus for providing series compensation to dampen out oscillation in an electric power transmission line which provides both real power and reactive power exchange with the power system. A particular feature of the invention is that it can provide injection of virtual positive real impedance in series with the transmission line to absorb real power as the generator accelerates during power oscillations. During those periods of the oscillation when the real power on the transmission line decreases, virtual negative real impedance is inserted in series with the transmission line to supply real power to the system. The virtual positive real impedance can be provided by a resistor which is selectively connected to absorb real power from the transmission line, and the virtual negative real impedance, which provides real power, can be provided by an energy storage device. The energy storage device, such as a battery or a super-conducting magnet, can be used to supply both the virtual absorbing real power, and the virtual negative real impedance by supplying real power. The virtual positive and negative real impedances are injected into the transmission line together with reactive compensation. A switching power converter generates a compensation voltage having a magnitude and a phase angle relative to transmission line current which provides the required reactive and virtual real impedances. This voltage is injected in series with the transmission line voltage through a coupling transformer.

The switching power converter generates both the positive and negative reactive power required internally. The real power is supplied and absorbed by power exchange means connected to the dc terminals of the switching power converter.

It is not necessary that both positive and negative real impedance be provided, although more precise control can be effected through injection of both positive and negative real impedance into the transmission line. The fact that it is not necessary in accordance with the invention to inject both positive and negative real impedance into the transmission line is advantageous because providing positive impedance is easier and less costly than providing negative real impedance.

More particularly, the invention is directed to:

Apparatus for providing series line compensation with enhanced capability to dampen oscillations in an electric power transmission line carrying ac current at a selected transmission line voltage and fundamental frequency, said apparatus comprising:

compensation means coupled in series with said transmission line injecting into said transmission line a compensation voltage at said fundamental frequency with controllable magnitude and phase angle relative to said ac current in said transmission line;

power exchange means selectively connected to said transmission line only through said compensation means; and control means controlling the controllable magnitude and phase angle of said compensation voltage to insert selected reactive and virtual real impedance into said transmission line to dampen said oscillations, and selectively connecting said power exchange means to said compensation means to enable said compensation means to provide said virtual real impedance.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
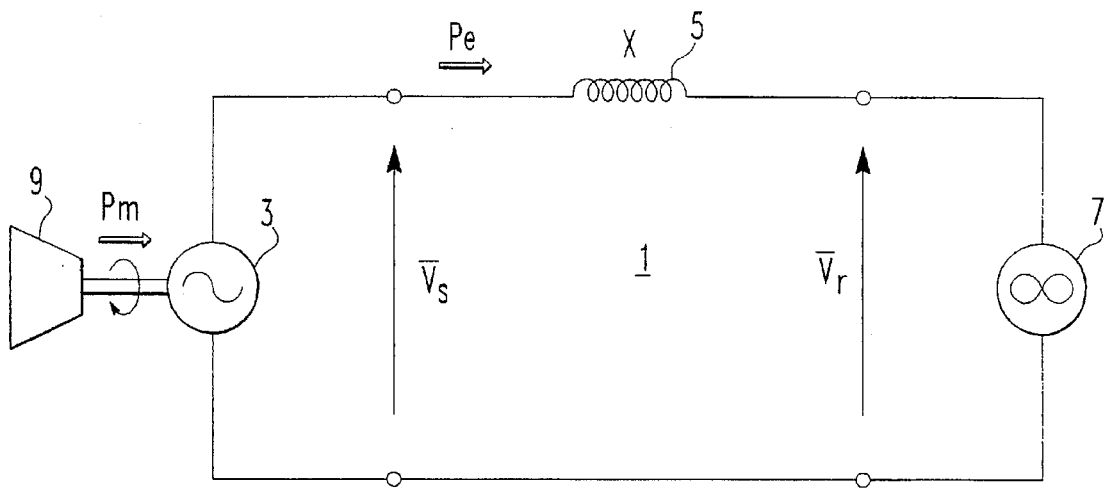
FIG. 1 is a schematic diagram of a simple power system.
Figure 2:
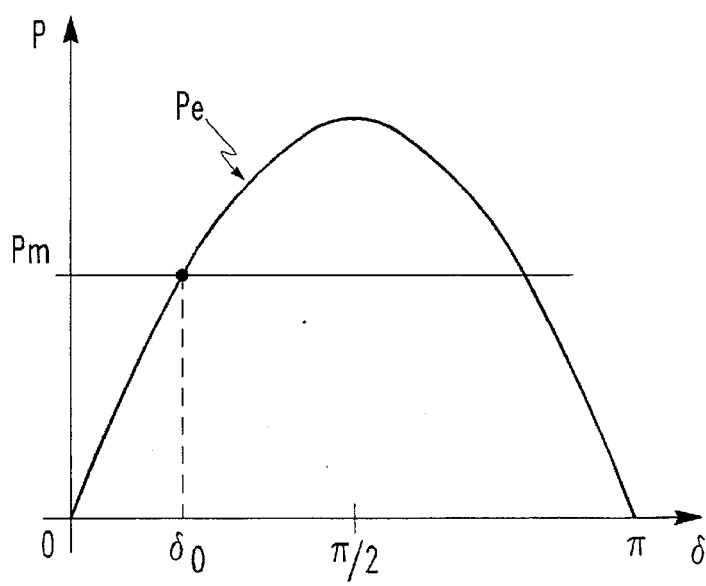
FIG. 2 is a plot of electric power transmitted versus transmission angle for the power system shown in FIG. 1.

The subject invention is directed to a novel series compensator for damping power oscillations in electric power systems. In order to explain the proposed operation and control of this novel series compensator reference is made to the simple power system shown in FIG. 1. This system 1 consists of a sending-end generator 3, a transmission line 5, represented by its series inductive impedance, X, and a receiving-end power system 7 that can be considered as a power bus of infinite capacity. If the voltage phasor at the sending-end of the transmission line 5 is s and that at the receiving-end is r, then the transmitted electric power, $P_e$, can be expressed by the following equation:

$$P_e = \{V_s \cdot V_r / X\} \sin \delta \qquad \text{Eq. (1)}$$

where Vs and Vr are the magnitudes of $\tilde{V}_s$ and $\tilde{V}_r$, respectively, and $\delta$ is the angle between $\tilde{V}_s$ and $\tilde{V}_r$. The power $P_e$ is shown plotted at fixed $V_s$, $V_r$, and X against angle $\delta$ in FIG. 2. It can be observed that the maximum transmittable power is $$P_e \max = V_s \cdot V_r / X \qquad \text{Eq. (2)}$$

obtained at $\delta = 90$ degrees.

In present power systems the power generator 3 is a rotating electro-magnetic machine that converts the mechanical input power $P_m$, usually provided by a steam or gas turbine 9, into the electric power $P_e$ feeding the transmission line 5. Under steady-state operating conditions, the mechanical input power $P_m$ is equal to the electrical output power $P_e$ (neglecting losses), and the turbine-generator set 3,9 runs at a constant speed such that a constant transmission angle $\delta_o$, necessary to satisfy the $P_m = P_e$ equilibrium, is maintained (see FIG. 2). The occurrence of power oscillation is due to the fact that, whereas the electric power $P_e$ can be changed almost instantaneously in the transmission line (often by unforeseen and accidental events such as transmission line faults and equipment failures), the mechanical input power $P_m$ can be changed only very slowly due to the nature of mechanical controls and the large inertia involved in the rotating system. Therefore, in the event of a transmission line fault or other disturbances in the electrical power system 1, the generator 3 receives more mechanical input power than the electric power transmittable by the faulty transmission system. As a result, the generator 3 starts to accelerate and the transmission angle becomes larger than the steady-state angle $\delta_o$. The process of acceleration of course means that the surplus mechanical energy is being stored mechanically by the rotating inertia of the turbine-generator set. In order to re-establish the steady-state equilibrium after fault clearing, this stored energy must be absorbed from the rotating mechanical system. Depending on the overall Q (quality) factor of the total electro-mechanical system, the absorption of this surplus energy can take a number of oscillatory cycles during which the electric power in the transmission system may widely fluctuate. In some cases, when the total system has negative damping, the magnitude of the oscillation keeps increasing until the system protection shuts-down the disturbed generator.

It is clear that, in principal, the oscillatory energy can be eliminated from the affected system in two ways. One is by increasing and decreasing the transmitted power in sympathy with the acceleration and deceleration of the generator and thus in sympathy with the positive-going and negative-going swings of the electric power. The other one is to subtract directly the surplus energy from the transmission system when the generator accelerates and dissipate it or return it to the system, from a temporary storage, when the generator is in the declaration interval.

U.S. Pat. No. 5,198,746 proposes a novel method for the implementation of only the first approach. That is, the series compensator is controlled to decrease the transmission line impedance, and thereby increase the transmitted power during the acceleration periods of the machine, and to increase the transmission line impedance, and thereby decrease the transmitted power during the deceleration periods. This is accomplished by injecting a voltage at the fundamental frequency (60 Hz) into the transmission line in quadrature with the current flowing in the transmission line. The injected voltage lags the current by 90° for capacitive impedance and leads it by 90° for inductive impedance. It is evident that the method of power oscillation damping described in U.S. Pat. No. 5,198,746 is based on a one dimensional modulation of the output of the series compensator. That is, the injected voltage is kept essentially in quadrature with respect to the line current so that the power exchange between the series compensator and the ac system is substantially reactive.

Figure 3A:
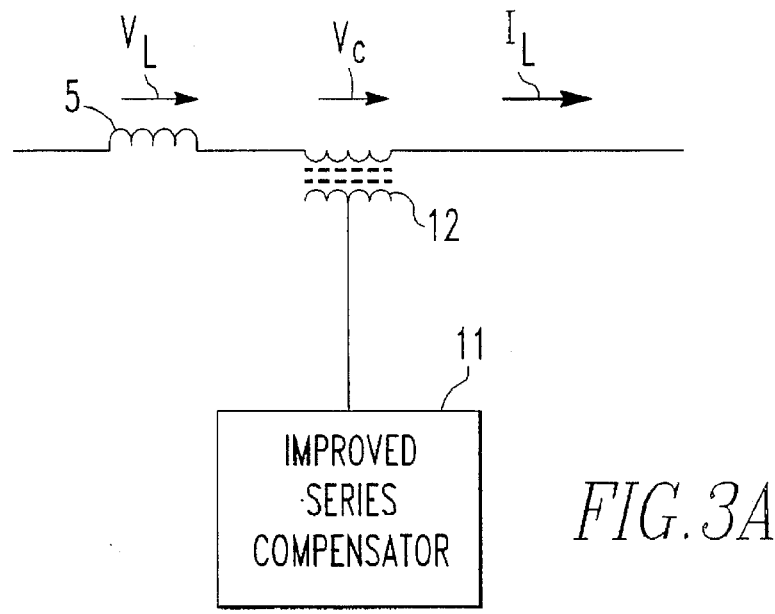
FIG. 3A is a schematic diagram of a portion of the power system of FIG. 1 incorporating the present invention.
Figure 3B:
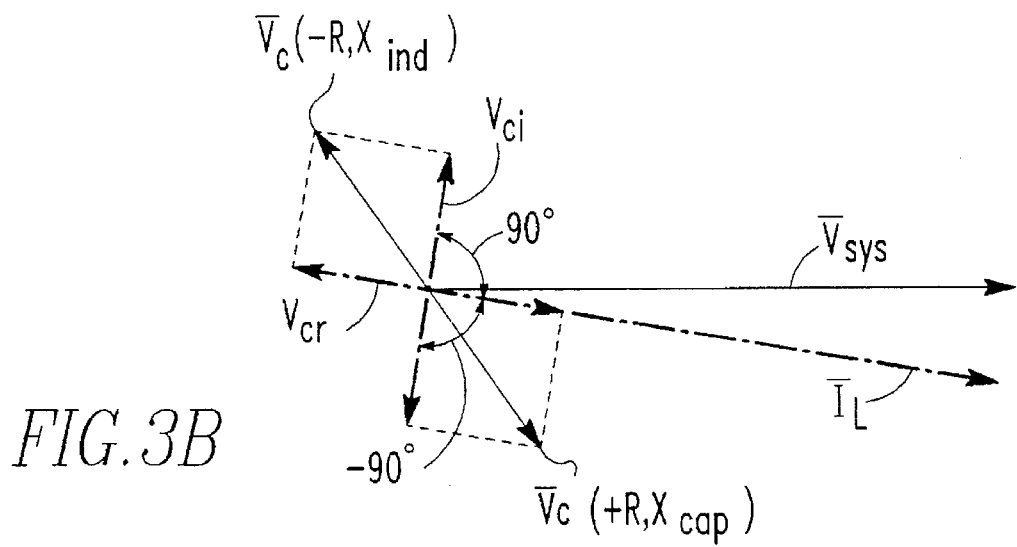
FIG. 3B is a phasor diagram illustrating the compensating voltage injected in accordance with the invention into the power system shown in FIG. 1.

Our invention is based on a two dimensional modulation of the output of a series compensator. That is, the phase angle between the injected fundamental (60 Hz) voltage and the transmission line current is chosen so as to force both reactive and real power exchange between the series compensator and the ac system. This is illustrated in FIGS. 3A and 3B. As shown in FIG. 3A, the series compensator 11 injects a compensation voltage $V_c$ into the transmission line 5 in series with the line voltage $V_l$ through a coupling transformer 12. FIG. 3B is a phasor diagram showing the injected voltage $V_c$, line current $I_L$, and system voltage $V_{sys}$ phasors. It can be observed that the injected voltage phasor $V_c$ has a component $V_{Ci}$ that is in quadrature with the line current and another component $V_{Cr}$ that is in-phase with the line current $I_L$. The quadrature voltage component $V_{Ci}$ represents the virtual reactive impedance that the series compensator provides for the compensation of the reactive line impedance in the manner proposed by U.S. Pat. No. 5,198,746. The real component of voltage $V_{Cr}$ represents a virtual positive real impedance (resistor) or a virtual negative real impedance (power source) in series with the line.

The variation of either the injected reactive impedance or the injected real impedance in sympathy with the transmission angle variation is effective to achieve power oscillation damping. The mechanism of damping with reactive impedance injection is explained in detail in U.S. Pat. No. 5,198,746 which is hereby incorporated by reference. It can be appreciated that, in addition to the increased power transmission provided by reactive series compensation, by injecting a real positive impedance (resistor) in the line at the time when the sending-end generator 3 accelerates due to excess mechanical power, part of the surplus real power is dissipated thereby helping to establish an equilibrium between the mechanical input power and the electric output power required for stable system operation. Similarly, the injection of a real negative impedance (in effect, a real power source) in the line, when the sending-end generator is unable to satisfy the momentary electric power demand and therefore it is decelerating, would clearly remove part of the burden from the generator and thus would help the stabilization of the system.

Generally, the overall approach proposed by this invention is to provide highly effective damping of power oscillations by injecting simultaneously both reactive and real impedance in series with the line. Both the reactive and real impedance are controlled in sympathy with the transmission angle (and the corresponding power) variation. The reactive impedance is controlled to increase the transmitted electric power when the sending-end generator accelerates and to decrease the transmitted power when the generator decelerates. The real impedance is controlled to be positive and thus consume real power when the generator accelerates and to be negative and thus generate real power when the generator decelerates.

Figure 4A:
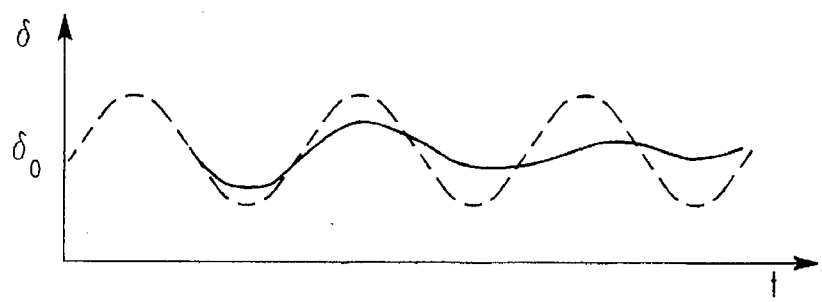
FIGS. 4A–4D illustrate waveforms pertinent to an understanding of the operation of the invention.
Figure 4B:
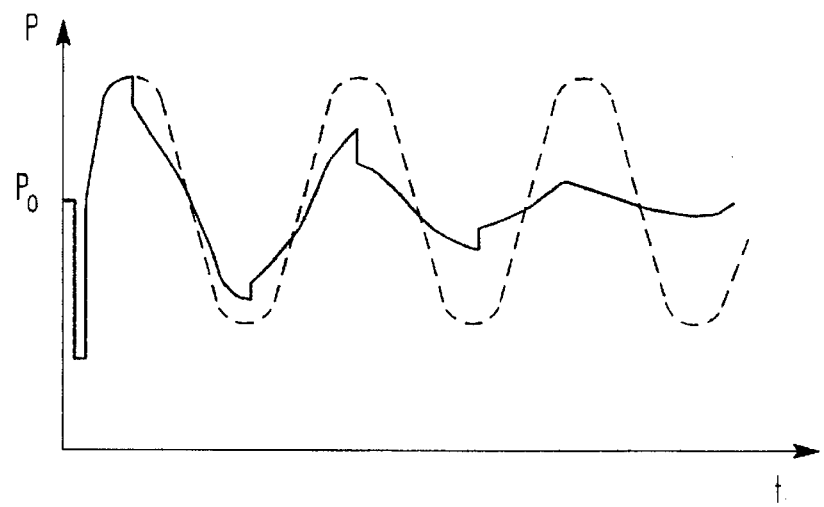
Figure 4C:
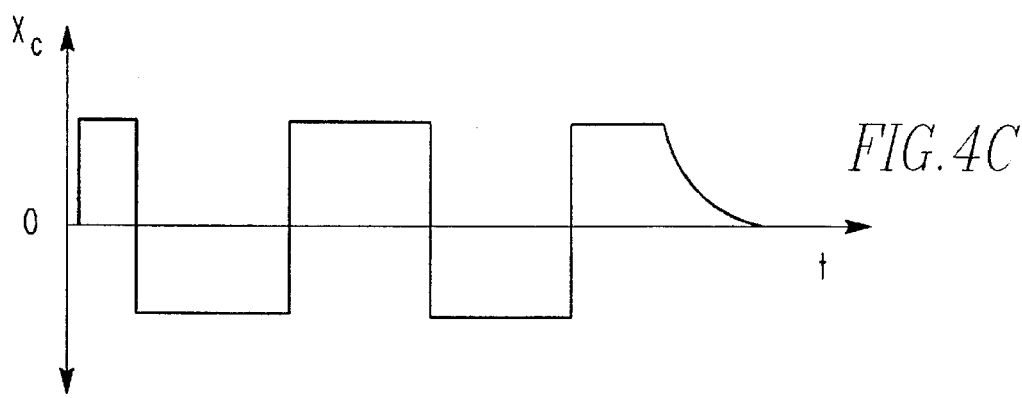
Figure 4D:
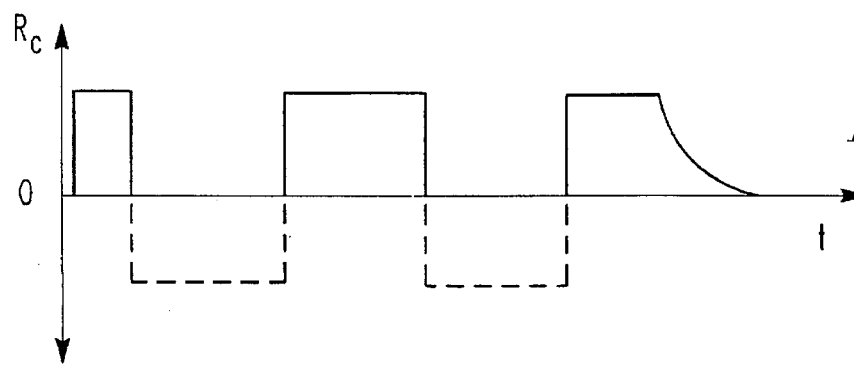

The proposed method for damping power oscillations in power systems is illustrated in FIGS. 4A-D, where the transmission angle $\delta$, the transmitted electric power P, and the reactive $X_c$ and real $R_c$ outputs, respectively, of the series compensator controlled between its maximum virtual capacitive and inductive impedance values and, respectively, the maximum virtual positive and negative real impedance values, are shown plotted against time. The dotted lines in the plots of the transmission angle and transmitted power represent an undamped oscillation while the solid lines illustrate the effect of damping in accordance with the invention. It should be noted that the variation of the real (or reactive) output between the maximum positive and maximum negative values is not a necessary requirement for effective damping. For example, effective damping can be achieved even if the inserted real or reactive impedance is varied between zero and a positive or negative maximum. As will be discussed, this is an important practical consideration because the implementation of a series compensator capable of injecting a virtual positive real impedance, in addition to a capacitive or inductive reactive impedance, is relatively simple and inexpensive, whereas the implementation of one that can also inject a virtual negative real impedance is relatively complex and expensive. The latter case in which only virtual positive real impedance is provided is illustrated in FIG. 4D where the virtual negative real impedance is shown in dashed line.

As explained previously, the series compensator of the invention is able to inject concurrently a virtual reactive and a virtual real impedance in series with the line. The magnitude of these virtual impedances are independently controllable within the VA rating limitation of the series compensator. This flexibility allows the selection of different operating modes for the series compensator under differing system conditions. Thus, various control strategies may be implemented to satisfy particular system requirements. In the preferred operating arrangement, the series compensator proposed is set up to provide reactive line compensation as the primary function to accomplish steady-state line impedance compensation and, in the case of parallel lines, line current equalization. However, whenever dynamic system disturbances are encountered, the series compensator can also execute the injection of a virtual real impedance in series with the line. The injected virtual reactive and virtual real impedances are controlled so as to maximize the electric load on the generator during its first and subsequent acceleration periods, and to minimize the electric load during the deceleration periods. This strategy provides maximum possible improvement in transient (first swing) stability and dynamic stability (oscillation damping) in addition to accomplishing the required steady-state line compensation requirements.

Figure 5:
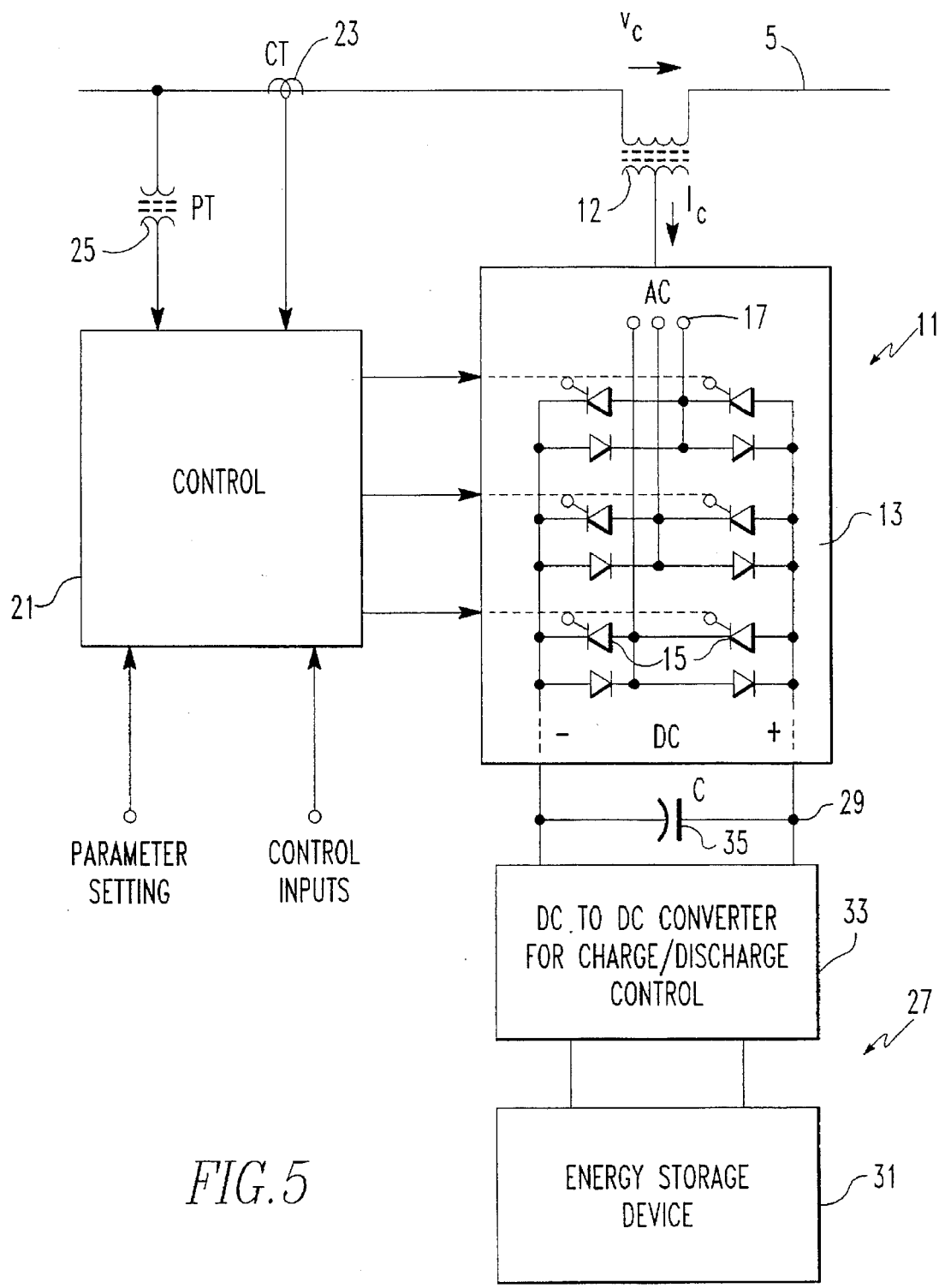
FIG. 5 is a schematic diagram of a series compensator for the electric power system of FIG. 1 in accordance with one embodiment of the invention.

A series compensator capable of generating reactive and real impedance outputs in accordance with the invention is shown in FIG. 5. The series compensator 11 includes a switching power converter in the form of a voltage-sourced dc to ac inverter 13 employing gate turn-off thyristors 15 (or other suitable power semi-conductor switches) to generate the ac voltage $V_c$ required for real and reactive series compensation. The ac terminals 17 of the inverter 13 are connected to the coupling transformer 12 which in turn is connected in series in the transmission line 5. The transformer 19 and transmission line 5 are shown in single line for clarity of presentation; however, it will be understood that they represent three-phase implementation. A control 21 senses transmission line currents and voltages through current transformers 23 and potential transformers 25, respectively (again, multiphase for 3 three-phase system). The control 21 utilizes these currents and voltages together with parameter settings and control inputs to generate firing signals for the switches 15 in the inverter 13 to generate the appropriate instantaneous values of real and reactive impedance represented by the voltage $V_c$ output by the inverter.

As discussed previously, the inverter 13 is capable of generating the virtual positive and negative reactive impedances internally. Real power to effect injection of virtual real impedance into the transmission line is provided by a power exchange device in the form of a real impedance source 27 connected to the dc terminals 29 of the inverter 13. In the embodiment of FIG. 5, the real impedance source 27 comprises an energy storage device 31 and a dc to dc converter 33 providing charging and discharging control for the energy storage device. The energy storage device 31 can be, for instance, a battery bank or a super conducting magnet. In this case, the energy storage device absorbs real power from the transmission line 5 through the inverter 13 to insert virtual positive real impedance into the transmission line, and returns real power through the inverter 13 to the transmission line to provide virtual negative real impedance. A capacitor 35 connected across the dc terminals 29 stabilizes the dc voltage applied to the inverter 13.

Figure 6:
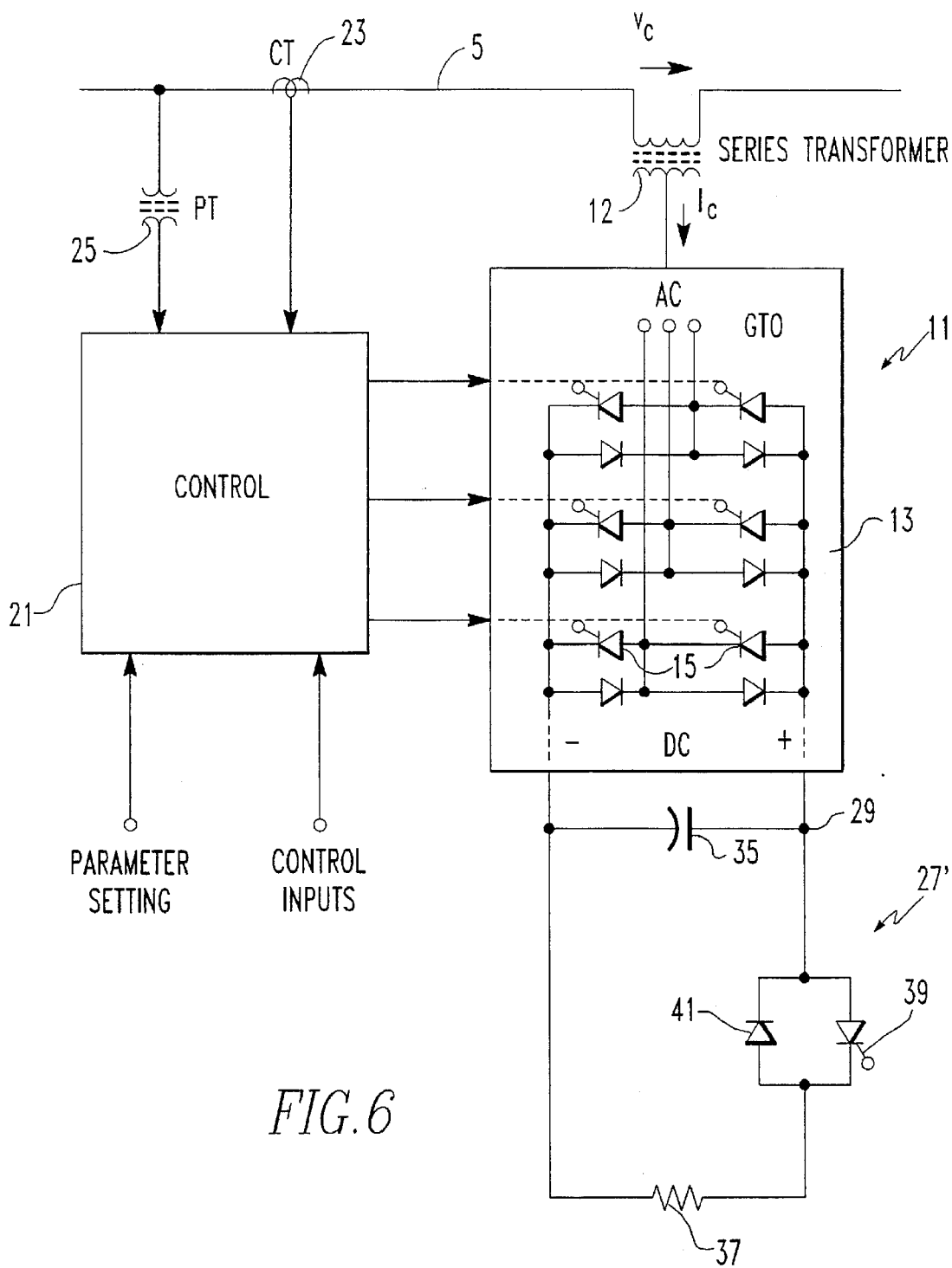
FIG. 6 is a schematic diagram of a second embodiment of a series compensator for damping power oscillations in the electric power system of FIG. 1.

Another embodiment of the invention is illustrated in FIG. 6 wherein the real impedance source 27' comprises a resistive load 37 selectively connected across the dc terminals 29 of the inverter 13 by a switch 39 shunted by a fly back diode 41. This embodiment of the series compensator can supply both positive and negative reactive impedance, but only positive real impedance. However, it is considerably less expensive than the embodiment of FIG. 5 and still provides substantially improved performance over the compensator of U.S. Pat. No. 5,198,746 which only provides reactive impedance compensation.

Figure 7:
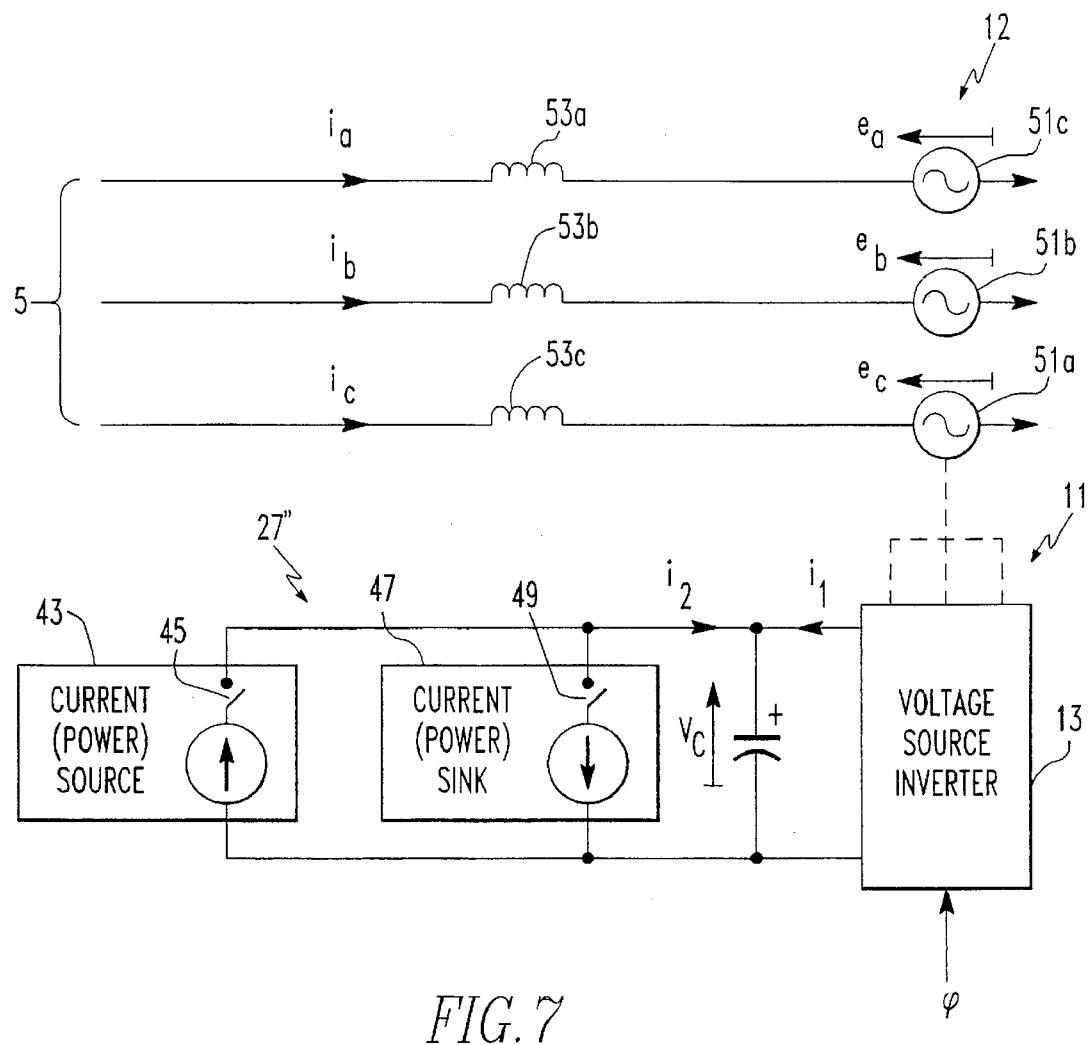
FIG. 7 is a schematic diagram of a generalized form of the series compensator of the invention for damping power oscillations in the electric power system of FIG. 1.

A generalized embodiment of the invention is shown in FIG. 7, where the power exchange device in the form of the real impedance source 27" comprises a current source 43 which may be selectively connected by switch 45 to supply real power (negative real impedance) to the inverter 13, and a current sink 47 which is selectively connected by a switch 49 to absorb real power (provide positive real impedance) from the inverter 13. For purposes of analysis to be explained, the coupling transformer 12 is represented as voltage sources 51a, b and c connected in each phase of the three-phase transmission line 5.

The functional operation of the series compensator 11 is accomplished by the appropriate control of the power inverter 13 producing the voltage injected in series with the line. Thus, the overall control system has two major functions: one, referred to as the internal control function, is the synchronization and appropriate operation of the solid-state inverter 13 to generate the required voltage, with the proper magnitude and phase angle in relation to the line current, in series with the line to achieve the desired degree of reactive impedance compensation and the real impedance insertion; the other, referred to as the external control function, is the determination of what reactive and real series compensation is needed (i.e., what magnitude and phase angle the inserted voltage must have) in order to provide the maximum improvement in transient stability and power oscillation damping.

The external control measures appropriate system variables, such as line voltages, currents, and frequency or rotational velocity, and derives reference signals for the internal control of the inverter. The operation and implementations of practical external control circuits related to the control of reactive impedance are described in U.S. Pat. No. 5,198,746.

The operation of the external control circuits can be extended to the control of the virtual real impedance insertion, to achieve power oscillation damping, by the following simple rule. Whenever the series compensator is to inject a capacitive reactive impedance to increase the transmitted power, the compensator also injects a positive real impedance in series with the line to absorb real power from the ac system. (This means that the power absorption from the accelerating generator is maximum—the line transmits increased power due to the series capacitive compensation and the series compensator absorbs additional real power.) Conversely, whenever the compensator is to inject an inductive (reactive) impedance to decrease the transmitted power, the compensator simultaneously injects a negative real impedance (if it has energy storage capability as shown in FIG. 5) or zero real impedance (if it is equipped only with a switched energy absorbing device (resistor) as shown in FIG. 6).

The internal control of the inverter is responsible for regulating the magnitude of the inverter ac output voltage and its phase angle in response to the system requirements as determined by the external control. FIG. 7 defines a polarity convention for each of the electrical variables that will be referred to in the following description of the internal control. In this simplified representation of FIG. 7, the system power losses are neglected, and the inverter 13 is viewed in a general way as a three-phase device whose terminal voltages appear in series with the transmission line. The leakage inductance of the power transformers 12 that couple the inverter into the line is shown as a nominal additional inductance 53a, b and c in series with the line.

In order to describe the internal control scheme, it is necessary to first define the mathematical model of the series compensator upon which it is based. The mathematical model uses the concept of instantaneous vectors to represent the three-phase voltage and current sets on the ac side of the inverter. Using this concept the three line currents are described instantaneously by a single vector with orthogonal components, $i_{ds}$ and $i_{qs}$. The definition of $i_{ds}$ and $i_{qs}$ in terms Of the actual line currents is as follows:

$$\begin{bmatrix} i_{ds} \\ i_{qs} \end{bmatrix} = \frac{2}{3} \begin{bmatrix} 1 & \frac{-1}{2} & \frac{-1}{2} \\ 0 & \frac{\sqrt{3}}{2} & \frac{-\sqrt{3}}{2} \end{bmatrix} \begin{bmatrix} i_a \\ i_b \\ i_c \end{bmatrix} \quad \text{Eq. (3)}$$

$$\theta = \tan^{-1}\left(\frac{i_{qs}}{i_{ds}}\right) \quad \text{Eq. (4)}$$

$$i = \sqrt{i_{ds}^2 + i_{qs}^2} \quad \text{Eq. (5)}$$

In these equations 3–5, θ is the angle of the current vector relative to the ds-axis of the coordinate system, and i is the instantaneous magnitude of the current vector. In a similar way, the injected series voltages are represented vectorially in (ds, qs) coordinates and then further transformed to a rotating frame of reference (d, q) in which the d-axis is always coincident with the line current vector. This transformation of the voltage is defined as follows:

$$\begin{bmatrix} e_d \\ e_q \end{bmatrix} = \frac{2}{3} \begin{bmatrix} \cos(\theta) & \cos\left(\theta - \frac{\pi}{3}\right) & \cos\left(\theta + \frac{\pi}{3}\right) \\ -\sin(\theta) & -\sin\left(\theta - \frac{\pi}{3}\right) & -\sin\left(\theta - \frac{\pi}{3}\right) \end{bmatrix} \begin{bmatrix} e_a \\ e_b \\ e_c \end{bmatrix} \quad \text{Eq. (6)}$$

In this reference frame the components of the series voltage vector, $e_d$ and $e_q$ account for the instantaneous real and reactive power drawn from the line respectively. The expressions for these power components are as follows:

$$\text{Real power } (P) = \frac{3}{2} \, ie_d \qquad \text{Eq. (7)}$$

$$\text{Reactive power } (Q) = \frac{3}{2} \, ie_q \qquad \text{Eq. (8)}$$

Figure 8:
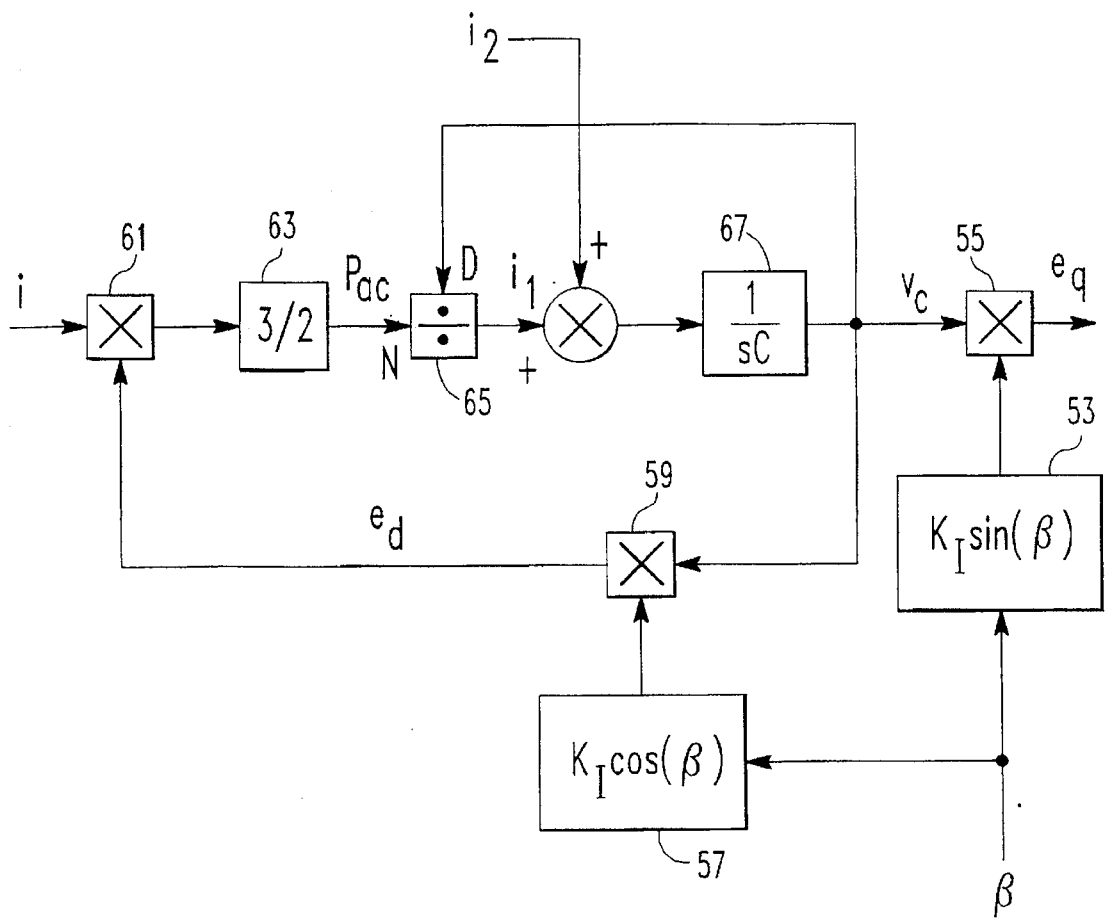
FIG. 8 is a block diagram of the series compensator in accordance with the invention.

In FIG. 8, these definitions are used to establish a block diagram of the series compensator (i.e., the system to be controlled.) In this diagram, the harmonic voltages generated by the inverter 13 are neglected and an instantaneous balance is assumed between the power at the ac-side and dc-side of the inverter. A constant, $K_f$, defines the ratio between the dc capacitor voltage $V_c$ and the peak phase voltage $e_d$, $e_q$ on the at-side of the inverter as shown at 53, 55, 57 and 59. A control angle, β, is defined as the angle by which the inverter voltage vector (i.e., the injected series voltage vector) leads the line current vector. This angle is set by the control system and can be changed rapidly and arbitrarily. As shown in FIG. 8, it sets the instantaneous value of the injected voltage at 53 and 57.

The ratio of $e_q$ to the magnitude of the line current vector, i, constitutes the instantaneous "reactance" presented by the compensator to the line, and the ratio of $e_d$ to i constitutes the instantaneous "resistance". It is further assumed that the line current is substantially determined by extraneous factors and the current is therefore viewed as an independent input to the system.

In FIG. 8, the control angle, β, is seen to influence the inverter ac terminal power, $P_{ac}$, determined at 61 and 63 from $e_d$ and the line current i directly through its effect on $e_d$ as shown at 57 and 59. The inverter ac-side power is matched by an equal dc-side power that defines at 65 an instantaneous capacitor charging current, $i_1$. An additional charging current, $i_2$, is provided by the dc real power source/sink 27. The sum of these charging currents is integrated by the capacitor 35 as represented at 67, bringing about a change in the dc capacitor voltage and hence a corresponding change in $e_d$ and $e_q$.

Figure 9:
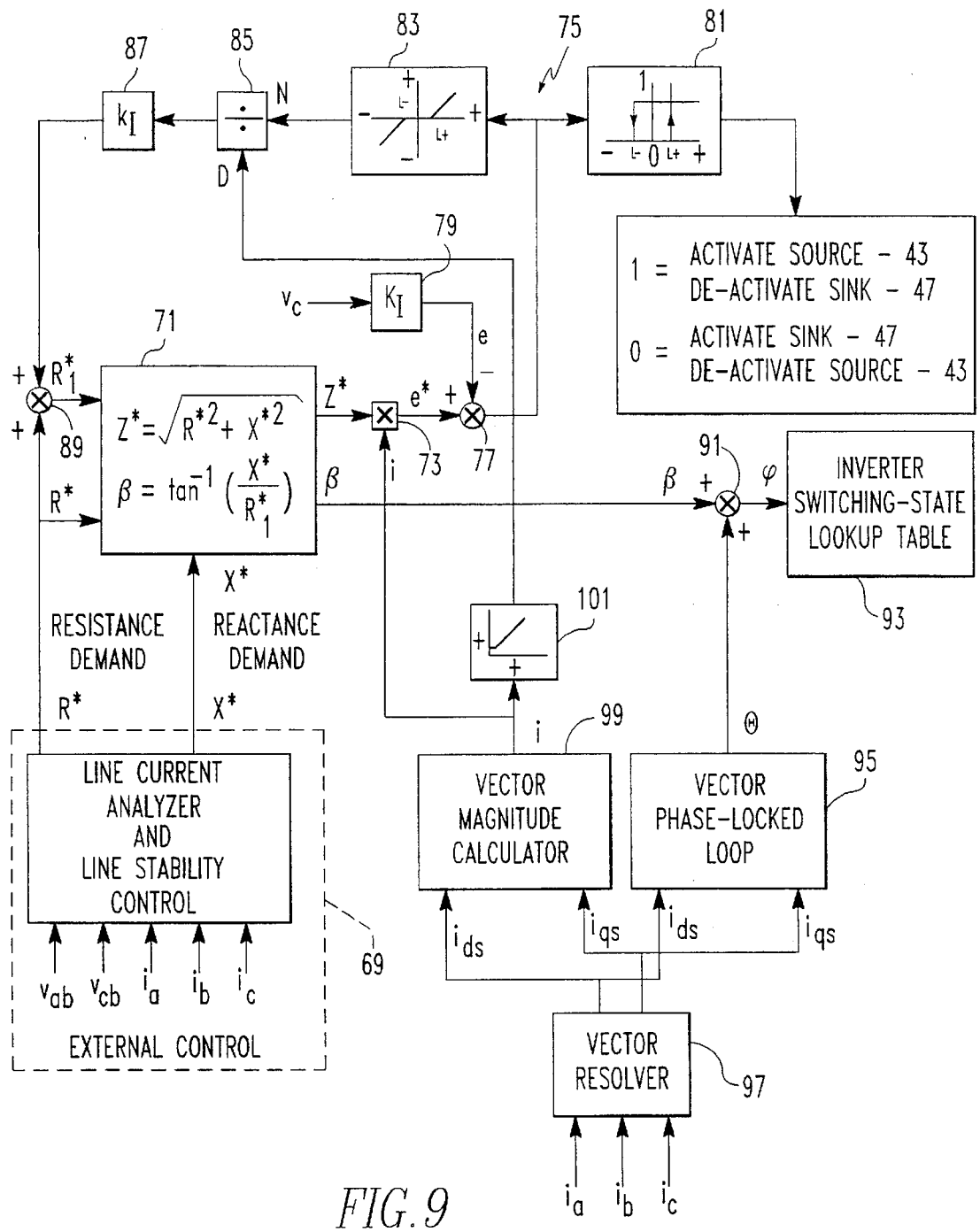
FIG. 9 is a block diagram of an internal control for the series compensator of the invention.

FIG. 9 is a block diagram of the proposed internal control scheme. The external control 69 generates demands for reactance, X*, and resistance, R*, based on its observation of the transmission line conditions (determined from measurements of transmission line currents and voltages) and power system considerations. These are combined at 71 to form an impedance magnitude demand, Z*. The reactance demand, X*, and an adjusted resistance demand, $R_1$*, are used to calculate the control angle, β. The impedance magnitude demand is multiplied at 73 by the magnitude of the line current vector, i, to obtain the magnitude of the desired series voltage, e*. Since the magnitude of the dc capacitor voltage, $V_c$, directly determines the magnitude of the series ac voltage, a feedback control loop 75 is provided to regulate the value of $V_c$. An error signal is computed at 77 from as the difference between e* and $V_c$ multiplied by a constant $K_f$ at 79 and passed to a controller 81 which either activates the dc power source 43 or the power sink 47 as appropriate in order to correct any deviation from the desired dc capacitor voltage. In FIG. 9, this controller 81 is shown as a simple hysteresis (bang-bang) type, although linear controllers might be used in practice.

In addition to this main control action, additional action is provided to cover the possibility that only a power sink 47 or only a power source 45, but not both, are included. When the dc-voltage error signal exceeds a set magnitude limit, it produces an amplified signal at 83 that is convened to an impedance by dividing by the current at 85. The quotient is scaled at 87 and added at 89 into the resistance demand, R*, to form the adjusted resistance demand, $R_1$*. This ensures that real power can always be negotiated to and from the transmission line to regulate the dc voltage whenever the regulation cannot be achieved by the dc source and/or sink. In effect, this additional action will override the resistance demand from the external controls to the extent that it does not request more real power than the inverter can source or sink.

The angle, β, is added to the angle, θ, of the line current vector at 91 to obtain a total angle, φ, for the series voltage vector, which is used at 93 to determine the state of the switches 15 in the inverter 13. The switch state selection is achieved by means of a look-up table of switch states that are stored sequentially and accessed solely as a function of φ, the desired angle of the series voltage vector. The contents of the look-up table are naturally different for the different possible inverter topologies and harmonic reduction schemes, but in all cases the input is an angle (φ) and the output is a set of switch states that are fed to the gate drive circuits that control the actual switching devices 15. The feedback signals, i and θ, are generated from actual current measurements. A vector phase-locked loop 95 calculates the angle θ from the orthogonal components $i_{ds}$ and $i_{qs}$ of the single vector representing the three phase current which is generated by a vector resolver 97 from the three phase currents. The orthogonal components $i_{ds}$ and $i_{qs}$ are also used by a vector magnitude calculator 99 to calculate the current magnitude i. Block 101 is a limiter that imposes a positive lower limit on magnitude i before it is passed to divider block 85. This prevents the output of block 85 from becoming too large.

Figure 10:
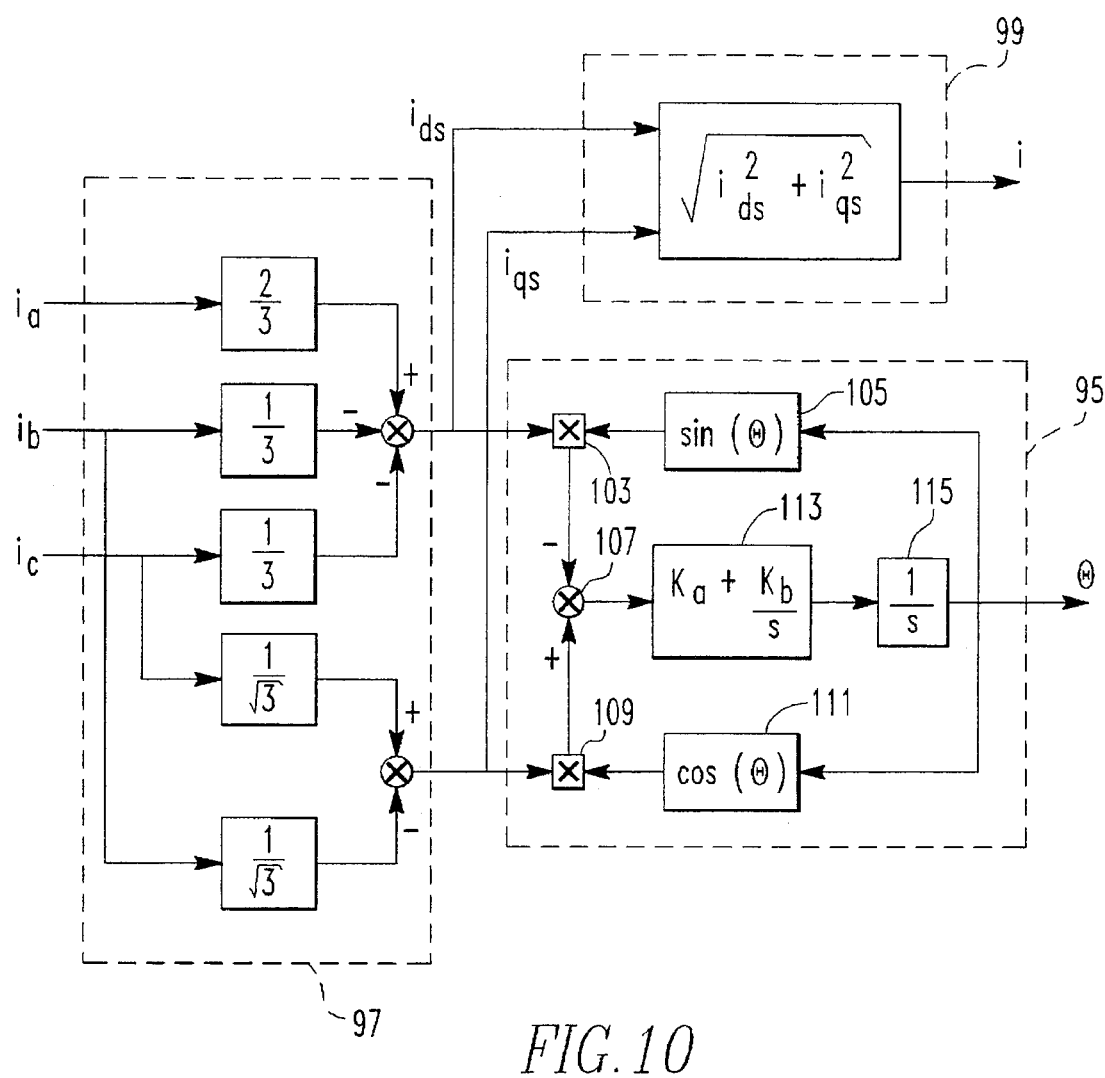
FIG. 10 is a block diagram illustrating in more detail portions of the internal control system of FIG. 9.

FIG. 10 illustrates in more detail, elements of the vector resolver 97, the vector phase-locked loop 95 and the vector magnitude calculator 99. The vector resolver 97 generates the real and imaginary components $i_{ds}$ and $i_{qs}$ of the current vector in the rotating reference system from the measured phase currents $i_a$, $i_b$ and $i_c$. It accomplishes this by implementing Equation 3, above. The vector magnitude calculator 99 generates the magnitude i of the single current vector through implementation of Equation 5, above.

The angle θ of the line current is not obtained in the preferred embodiment of the invention by the arctangent calculation of Equation 4, but rather by means of the vector phase-locked loop 95 which closely tracks the angular rotation of the current vector represented by the components $i_{ds}$ and $i_{qs}$ provided by the vector resolver 97. The real component $i_{ds}$ is multiplied at 103 by the sine of the angle θ derived at 105. This product is subtracted in the difference junction 107, from the product calculated at 109 of the imaginary component $i_{qs}$ of the current and the cosine of the angle θ derived at 111. Proportional plus integral control is applied to the difference at 113 and integrated at 115 to generate the angle θ.

The subject invention provides controllable series, reactive line compensation and a virtual real impedance insertion which result in dramatic improvement in transient stability and oscillation damping in an electric power transmission system.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for providing series line compensation with enhanced capability to dampen oscillations in an electric power transmission line carrying ac current at a selected transmission line voltage and fundamental frequency, said apparatus comprising:

compensation means coupled in series with said transmission line injecting into said transmission line a compensation voltage at said fundamental frequency with controllable magnitude and phase angle relative to said ac current in said transmission line;

power exchange means selectively connected to said transmission line only through said compensation means; and control means controlling the controllable magnitude and phase angle of said compensation voltage to insert selected reactive and virtual real impedance into said transmission line to dampen said oscillations, and selectively connecting said power exchange means to said compensation means to enable said compensation means to provide said virtual real impedance.

2. The apparatus of claim 1 wherein said power exchange means comprises at least positive real impedance.

3. The apparatus of claim 2 wherein said positive real impedance means comprises resistor means.

4. The apparatus of claim 1 wherein said power exchange means comprises both positive and negative real impedance and wherein said control means selectively connects said positive and negative real impedance to said compensation means to enable said compensation means to provide virtual positive real impedance and virtual negative real impedance to said transmission line.

5. The apparatus of claim 1 wherein said power exchange means comprises at least negative real impedance means.

6. The apparatus of claim 1 wherein said power exchange means comprises storage means alternatively storing real power drawn by said compensation means from said transmission line during positive surges in power on said transmission line and returning real power to said transmission line through said compensation means during negative surges in power during power oscillations on said transmission line.

7. Apparatus for providing series line compensation with enhanced capability to dampen oscillations in an electric power transmission line carrying ac current at a selected transmission line voltage and fundamental frequency, said apparatus comprising:

switching power converter means coupled in series with said transmission line injecting into said transmission line a compensation voltage at said fundamental frequency with controllable magnitude and phase angle relative to said ac current in said transmission line;

power exchange means including at least positive real impedance means; and control means controlling the controllable magnitude and phase angle of said compensation voltage to insert selected reactive and virtual real impedance into said transmission line to dampen said oscillations, said virtual real impedance being supported by said power exchange means and said reactive impedance being generated within said switching power converter means.

8. The apparatus of claim 7 wherein said positive real impedance means comprises resistor means.

9. The apparatus of claim 7 where said power exchange means comprises both positive and negative real impedance means.

10. The apparatus of claim 9 wherein said control means alternatively connects said positive and negative real impedance means to said switching power converter means.

11. The apparatus of claim 9 wherein said power exchange means comprises storage means absorbing real power from said transmission line through said switching power converter means to provide positive real impedance during positive surges in power on said transmission line, and supplying real power to said transmission line through said switching power converter means to provide negative real impedance during negative surges in power on said transmission line.

12. The apparatus of claim 11 wherein said storage means comprises battery means.

13. The apparatus of claim 11 wherein said storage means comprises superconducting magnet means.

14. A method for providing series line compensation with enhanced capability to dampen oscillations in an electric power transmission line carrying ac current at a selected transmission line voltage and fundamental frequency, said method comprising the steps of:

coupling compensation means in series with said transmission line to inject into said transmission line a compensation voltage at said fundamental frequency with controllable magnitude and phase angle relative to said ac current in said transmission line;

selectively connecting power exchange means to said transmission line only through said compensation means; and controlling the controllable magnitude and phase angle of said compensation voltage to insert selected reactive and virtual real impedance into said transmission line to dampen said oscillations, and selectively connecting said power exchange means to said compensation means to enable said compensation means to provide said virtual real impedance.

15. The method claim 14 wherein said step of selectively connecting said power exchange means comprises selectively connecting resistor means to said transmission line only through said compensation means.

16. The method of claim 14 wherein said step of selectively connecting said power exchange means comprises selectively connecting positive and negative real impedance means to said compensation means to enable said compensation means to provide virtual positive real impedance and virtual negative real impedance to said transmission line.

17. A method of providing series line compensation with enhanced capability to dampen oscillations in an electric power transmission line carrying ac current at a selected transmission line voltage and fundamental frequency, said method comprising the steps of:

coupling switching power converter means in series with said transmission line to inject into said transmission line a compensation voltage at said fundamental frequency with controllable magnitude and phase angle relative to said ac current in said transmission line;

providing power exchange means including positive real impedance means; and controlling the controllable magnitude in phase angle of said compensation voltage to insert selected reactive and virtual real impedance into said transmission line to dampen said oscillations, said virtual real impedance being supported by said power exchange means and said reactive impedance being generated within said switching power converter means.

18. The method of claim 17 wherein said step of providing power exchange means comprises providing energy storage means, and wherein said controlling step comprises controlling the magnitude and phase angle of said compensation voltage such that said storage means absorbs real power from said transmission line through said switching power converter means to provide positive real impedance during positive surges in power on said transmission line, and to supply real power to said transmission line through said switching power converter means to provide negative real impedance during negative surges in power on said transmission line.

19. An apparatus for providing series line compensation with enhanced capability to dampen oscillations in an electric power transmission line carrying ac current at a selected transmission line voltage and fundamental frequency, said apparatus comprising:

compensation means coupled in series with said transmission line and being adapted to inject into said transmission line two ac voltage components with controllable magnitude at the said fundamental frequency, a first one of said voltage components being in quadrature with said transmission line current and a second one of said voltage components being in-phase with said transmission line current; and control means for coordinately controlling said controllable magnitude of said first and second voltage components in response to transmission line voltage and current conditions, said first voltage component being controlled to adjust the steady-state and dynamic flow of electric power in said transmission line and said second voltage component being controlled to temporarily supply or absorb from said transmission line electric power in order to effectively dampen the oscillation of power flow in said transmission line.

20. The apparatus of claim 19, wherein said control means coordinately controls, in response to said transmission line voltages and currents, said controllable magnitude of said first voltage component and said controllable magnitude of said second voltage component to establish a controllable virtual reactive impedance and a controllable virtual real impedance in series with said transmission line.

21. The apparatus of claim 20, wherein said control means comprises:

an internal control means controlling said compensation means to inject said controllable virtual reactive impedance and said controllable virtual real impedance in series with the line, and external control means deriving dynamic reference values for said controllable virtual reactive impedance and said controllable virtual real impedance in response to sensed transmission line voltages and currents.

22. The apparatus of claim 19, wherein said compensation means comprises a switching power converter which is coupled by coupling means to an electric energy storage means.

23. The apparatus of claim 22, wherein said coupling means is a switching means controlling the real power flow between said switching converter means and said electric energy storage means.

24. The apparatus of claim 22, wherein said switching converter means is an ac to dc inverter and said coupling means is a dc to dc converter.

25. The apparatus of claim 22, wherein said energy storage means is an energy dissipating means and the coupling means is an electronic switching means controlling the real power dissipation in said energy dissipating means.

26. The apparatus of claim 25, wherein said energy dissipating means is a resistor.

27. A method for providing series line compensation with enhanced capability to dampen oscillations in an electric power transmission line carrying ac current at a selected transmission line voltage and fundamental frequency, said method comprising the steps of:

coupling a compensation means in series with said transmission line to inject into said transmission line two ac voltage components with controllable magnitude at the said fundamental frequency, a first one of said voltage components being in quadrature with said transmission line current and a second one of said voltage components being in-phase with said transmission line current; and coordinately controlling said controllable magnitude of said first and second voltage components from said compensation means in response to transmission line voltage and current conditions, said first voltage component being controlled to adjust the steady-state and dynamic flow of electric power in said transmission line and said second voltage component being controlled to temporarily supply or absorb from said transmission line electric power in order to effectively dampen the oscillation of power flow in said transmission line.

28. The method of claim 27, wherein step of controlling said controllable magnitude of said first and second voltage components from said compensation means, in response to transmission line voltage and current conditions, controls said controllable magnitude of said first voltage component and said controllable magnitude of said second voltage component to establish a controllable virtual reactive impedance and a controllable virtual real impedance in series with said transmission line.

* * * * *